UNITED STATES PATENT OFFICE.

CARLETON ELLIS, OF MONTCLAIR, NEW JERSEY, ASSIGNOR TO CLINTON S. LUTKINS, OF RYE, NEW YORK.

PROCESS OF MAKING A MIXTURE OF NITROGEN AND HYDROGEN.

1,327,029.     Specification of Letters Patent.     Patented Jan. 6, 1920.

No Drawing.     Application filed May 18, 1916. Serial No. 98,421.

*To all whom it may concern:*

Be it known that I, CARLETON ELLIS, a citizen of the United States, residing at Montclair, in the county of Essex and State of New Jersey, have invented certain new and useful Improvements in Processes of Making a Mixture of Nitrogen and Hydrogen, of which the following is a specification.

The present invention relates to the production of a gas mixture consisting essentially of hydrogen and nitrogen, suitable for the production of ammonia by catalysis, using, for example, such a catalyst as is shown in my copending application, Serial No. 66,950, filed Dec. 15, 1915, of which the present case is a continuation in part. Said application 66,950, is in turn a division of my older application, Serial No. 714,155. These two applications have now matured into Patents 1,184,839 and 1,167,280, respectively. The nitrogen-hydrogen mixture when prepared is likewise suitable for other processes of producing ammonia, and in the present case it is accordingly not necessary to discuss particular catalysts or particular methods of producing ammonia.

The mixture of hydrogen and nitrogen used should be as free as possible from oxygen, water, sulfur compounds and oxids of carbon especially carbon dioxid, but for some catalysts small amounts or traces of carbon monoxid, and certain other gases do not appear to be particularly injurious, except as diluents. The gas mixture may be produced in accordance with my invention, in several ways by modifications falling within the scope thereof. The mixture may be produced, for example, by the following procedure. Air and steam are blown through a gas generator or producer, which may be fed with coke breeze, hard coal dust, etc., or with other coal or coke, which are low in volatile hydrocarbons and in this manner, by careful regulation of the air and steam supply, a gas can be obtained containing approximately

| | |
|---|---|
| Hydrogen | 15% |
| Carbon monoxid | 20% |
| Carbon dioxid | 2% |
| Nitrogen | 63% |
| Sulfur, etc. | traces |

Gas produced by processes such as here described, is hereinafter referred to under the expression "water-producer gas." This mode of preparing gas differs from the production of ordinary producer gas, in that steam is admitted with the air blast, and differs from the ordinary production of water gas in that air and steam are simultaneously injected into the bed of hot fuel.

The sensible heat of the gas may be used to generate steam, etc., by being passed through the tubes of a boiler, and thereafter the gas may be highly compressed and the heat of compression duly utilized, and the gas cooled, whereby most of the carbon dioxid, water, etc., and under some conditions, carbon monoxid, will be liquefied, leaving nitrogen and hydrogen, more or less pure.

In some cases the gases are then passed in contact with lime and iron compounds (*e. g.* ferric hydrate) or other agents to remove practically all the carbon dioxid, sulfur compounds and moisture, should any of these remain after the compression treatment and carbon monoxid may be likewise duly removed, and the gas mixture will then contain approximately 15 parts of hydrogen to 63 parts, or less, of nitrogen (by volume) or approximately 1:4 by volume.

The gas mixture may be passed over a contact mass to convert its hydrogen into ammonia, leaving an excess of nitrogen which, if desired may be utilized by passing into contact with calcium carbid to produce calcium cyanamid, but such a dual procedure is not ordinarily advisable, as it is generally undesirable to produce two different products in cases of this kind.

A preferable manner of working is to add hydrogen which should be substantially dry and wholly or esssentially and substantially free from oxygen, carbon dioxid, sulfur compounds, and other gases which have a poisoning effect upon the contact mass employed, to bring up the ratio of hydrogen to nitrogen, by volume, 3:1, as near as possible.

A form of hydrogen possessing superior advantages is that obtained by the electrolysis of water. It is free or substantially free from sulfur and sulfur compounds which in some cases have a pronounced deadening action on catalytic material, and which are difficult of removal entirely from gases containing these bodies, while the electrolytic hydrogen has the advantage that oxygen and chlorin when present are more easily handled.

Electrolytic hydrogen from cells in which salt is electrolyzed, which hydrogen contains small quantities of air, water, traces of chlorin, etc., may be first passed over a catalyzer containing platinized asbestos, whereby the oxygen unites with hydrogen to form $H_2O$ and the chlorin may likewise unite with hydrogen to form HCl, which are removed by condensation, or by passage over lime, or by any other appropriate method, leaving hydrogen, often containing traces of nitrogen which may be added to the gas mixture deficient in hydrogen, such as the 1:4 mixture of hydrogen and nitrogen referred to above, in the proportion to produce a 3:1 mixture.

The carbon monoxid liquefied from the producer or generator gas may be used for various purposes, e. g. for combustion in a gas engine, or under a boiler, for generating power for operation of the gas compressors, etc., and by a suitable arrangement of heat interchangers the cost of producing the mixture of hydrogen and nitrogen can be reduced to a minimum.

Another suitable method of producing the hydrogen to use in the process is by removing the carbon dioxid and monoxid from water gas, for example by liquefaction, and the sulfur compounds (e. g. $H_2S$) may be removed by treatment with iron hydroxid. The last traces of carbon dioxid and moisture are removed by means of a suitable absorbing agent such for example an alkaline absorbing body as quicklime and the like.

In using this method, the water gas and producer gas, as they come from the cupolas may be mixed, and the carbon monoxid and dioxid, sulfur, moisture, etc., entirely removed from the mixed gases, leaving the 3:1 gas mixture.

In passing the gases repeatedly over the contact mass, any existing excess of either gas over the ratio of 3:1 will accumulate, and for best conditions of operation, periodically, the gases in or entering the contact chamber should be tested to see that this ratio exists, and any material variation therefrom should be compensated for by appropriate additions of gas. Also, if any considerable amount of inert diluents are present in the gases, these will progressively increase and when the amount of diluents gets sufficiently high to interfere with the operation, the gas should be allowed to escape to waste, or be otherwise utilized, or the diluents removed by appropriate methods, e. g. if the diluent gas consists largely of carbon monoxid, this may be removed by liquefaction, after which the hydrogen and nitrogen may be returned to the process.

To recapitulate, my invention relates to the production of a mixture of hydrogen and nitrogen adapted for use in the catalytic synthesis of ammonia which invention in its preferred form comprises preparing a gaseous mixture of hydrogen and nitrogen and in removing from the mixture bodies such as oxygen, moisture, carbon dioxid, and the like which interfere with the combination of the nitrogen and hydrogen and in adjusting the proportions of the latter gases to give the desired proportions preferably one volume of nitrogen to three volumes of hydrogen by adding to the gas mixture that component in which it is deficient, such addition taking place before or after the removal of the bodies of a deleterious character, and the invention further relates to the use of electrolytic hydrogen in the preparation of the gas composition involved herein, including removal from such electrolytic hydrogen of the oxygen or the chlorin and the like which would interfere with the reaction of synthesis of ammonia. By admixing such purified electrolytic hydrogen with the nitrogen-bearing gas a mixture in the proper proportions is obtained especially suited for the production of synthetic ammonia.

While I have described my process in detail, I do not limit myself to these exact details, but only by the scope of the following claims.

What I claim is:—

1. The process of making a mixture containing hydrogen and nitrogen in certain proportions, which comprises first producing in a single operation, a mixture containing water gas and producer gas, removing at least the greater part of the carbon monoxid from the gas mixture by liquefaction and passing the resulting gas mixture over lime and an iron compound capable of removing sulfur, to thereby produce a mixture consisting essentially of hydrogen and nitrogen, the H:N ration being lower than 3:1; purifying hydrogen gas to remove its content of substances capable of deleteriously affecting catalyzers employed in ammonia synthesis; and adding such purified hydrogen to the said mixture of gases in such proportions as to produce a 3:1 mixture.

2. The process of making a mixture containing hydrogen and nitrogen in certain proportions, which comprises first treating hot carbonaceous matter continuously with steam and air to produce a mixture containing water gas and producer gas, removing carbon monoxid from the gas mixture by liquefaction and removing the entire amount of carbon dioxid, sulfur compounds, and water to leave a mixture containing hydrogen and nitrogen in a lower H:N ratio than 3:1 but not essentially free from traces of carbon monoxid; purifying hydrogen gas containing small quantities of water, acid and chlorin by passing the same over a catalyzer adapted to convert such impurities into readily absorbable bodies, completely removing such bodies from the hydrogen gas; and adding such purified hydrogen gas to the said mixture of gases in such proportion as to produce a 3:1 ratio.

In testimony whereof I affix my signature.

CARLETON ELLIS.